United States Patent [19]

Petry et al.

[11] 3,724,788
[45] Apr. 3, 1973

[54] RAPID EXTRACTION SYSTEM

[75] Inventors: Gene A. Petry, Conover; Michael H. Reagan, Dayton, both of Ohio

[73] Assignee: The United States of America as represented by the Secretary of the Air Force

[22] Filed: June 3, 1971

[21] Appl. No.: 149,493

[52] U.S. Cl. .............................................. 244/137 R
[51] Int. Cl. .............................. B64d 9/00, B64d 1/00
[58] Field of Search.....244/137 R, 138 R, 151 R, 244/151 A, 151 B

[56] References Cited

UNITED STATES PATENTS 3,141,641  7/1964  Beadle et al. ..................... 244/138 R
3,396,924  8/1968  Kriesel ............................. 244/137 R
3,520,501  7/1970  Bronn et al. ...................... 244/137 R
3,642,235  2/1972  Criley et al. ...................... 244/137 R

*Primary Examiner*—Milton Buchler
*Assistant Examiner*—Jesus D. Sotelo
*Attorney*—Harry A. Herbert, Jr. and Arthur R. Parker

[57] ABSTRACT

Rapid extraction means for extracting a series of interconnected cargo loads from the cargo space of a delivery aircraft, in which a force-transfer mechanism is utilized to initially apply the extraction force of an extraction parachute assembly directly to the leading cargo load, and thereafter automatically transfer the continued extraction force being exerted to a series of static-deployment lines interconnected with a recovery parachute assembled to each cargo load.

4 Claims, 19 Drawing Figures

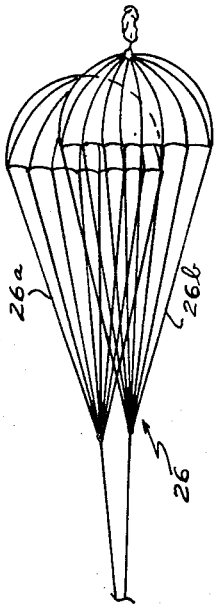
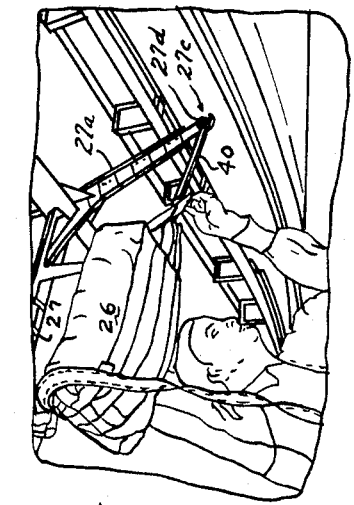
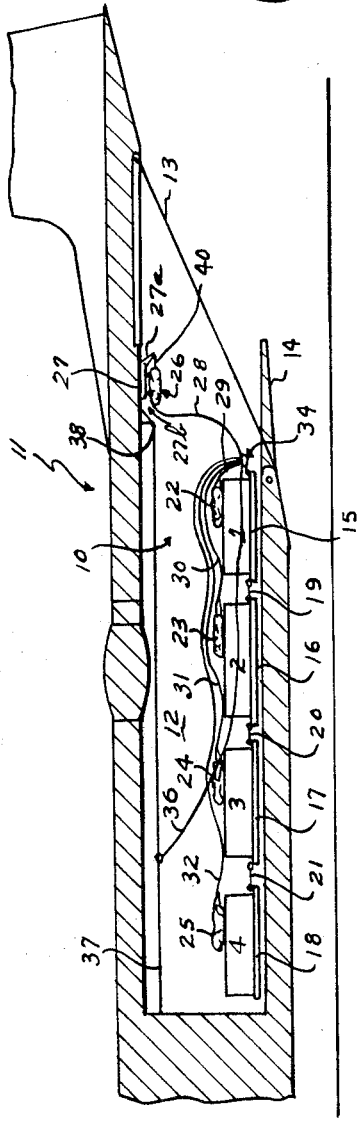

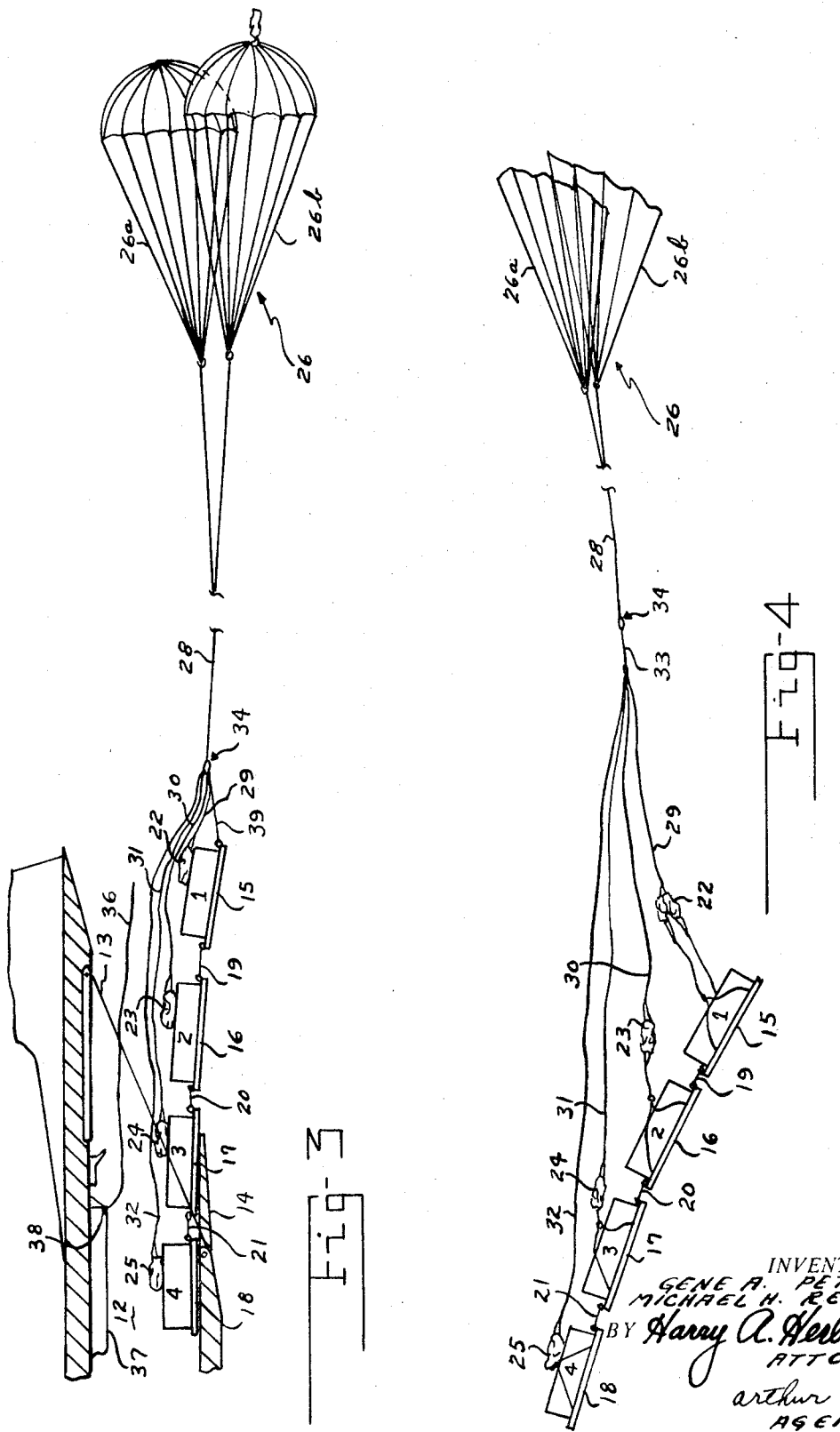

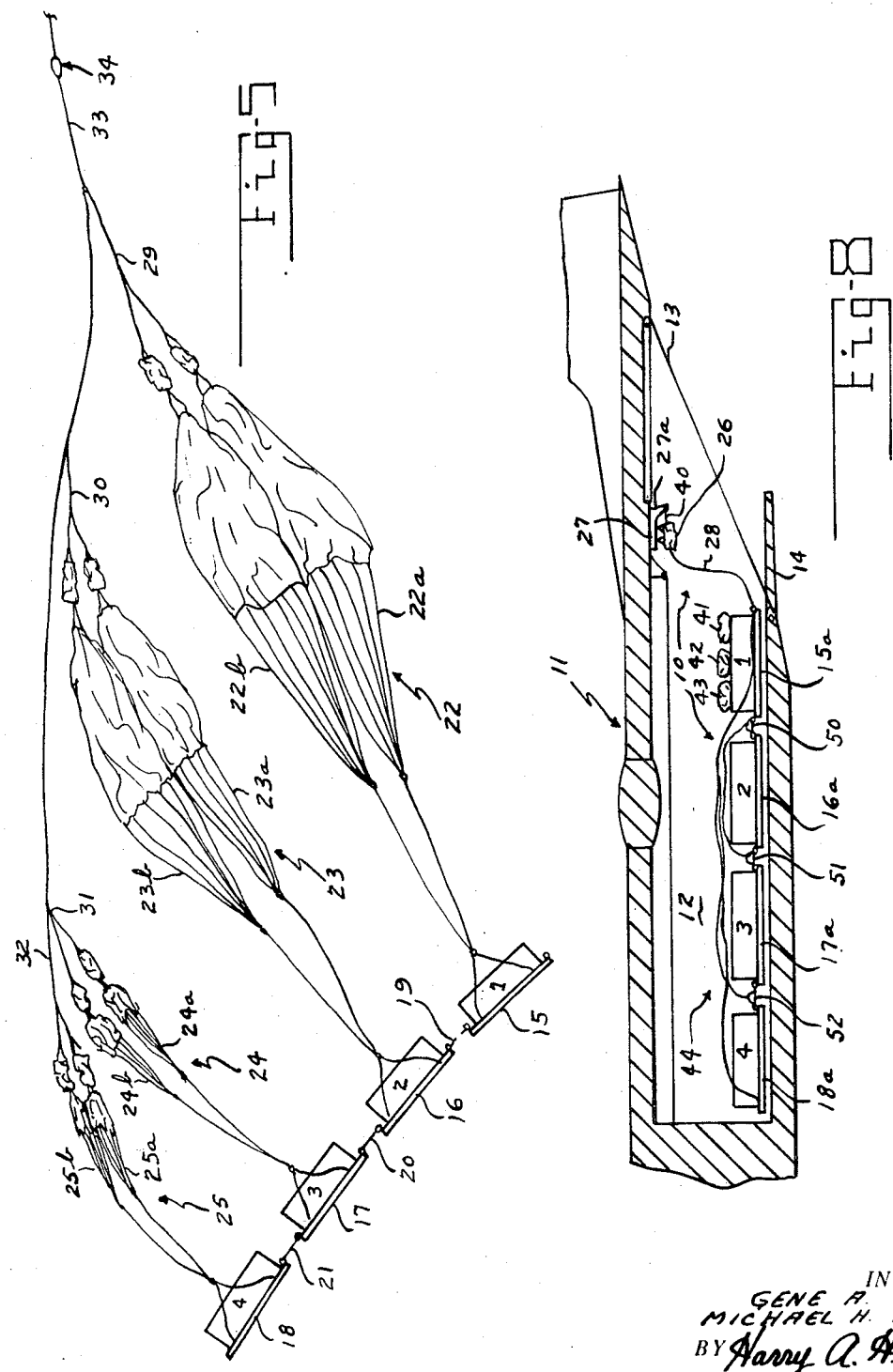

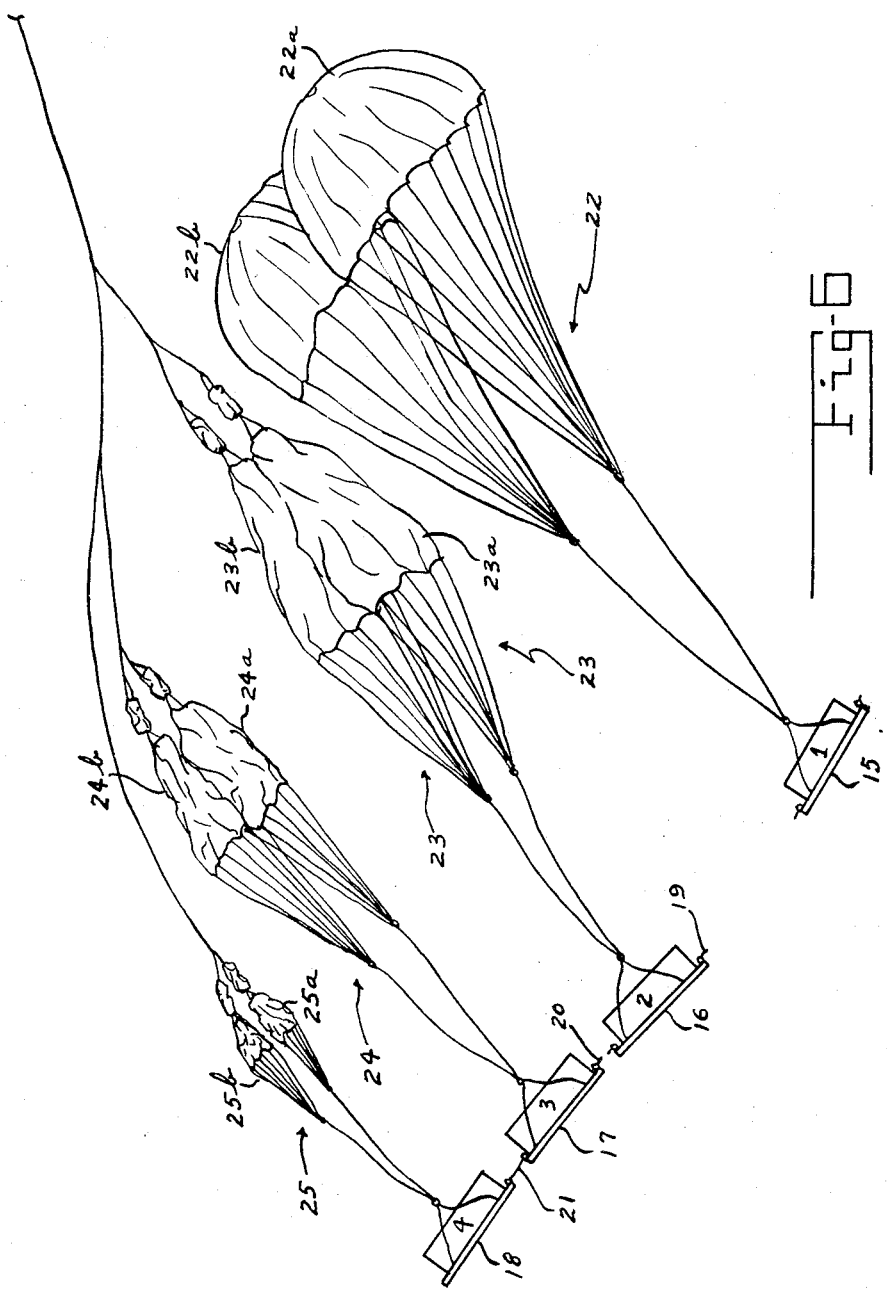

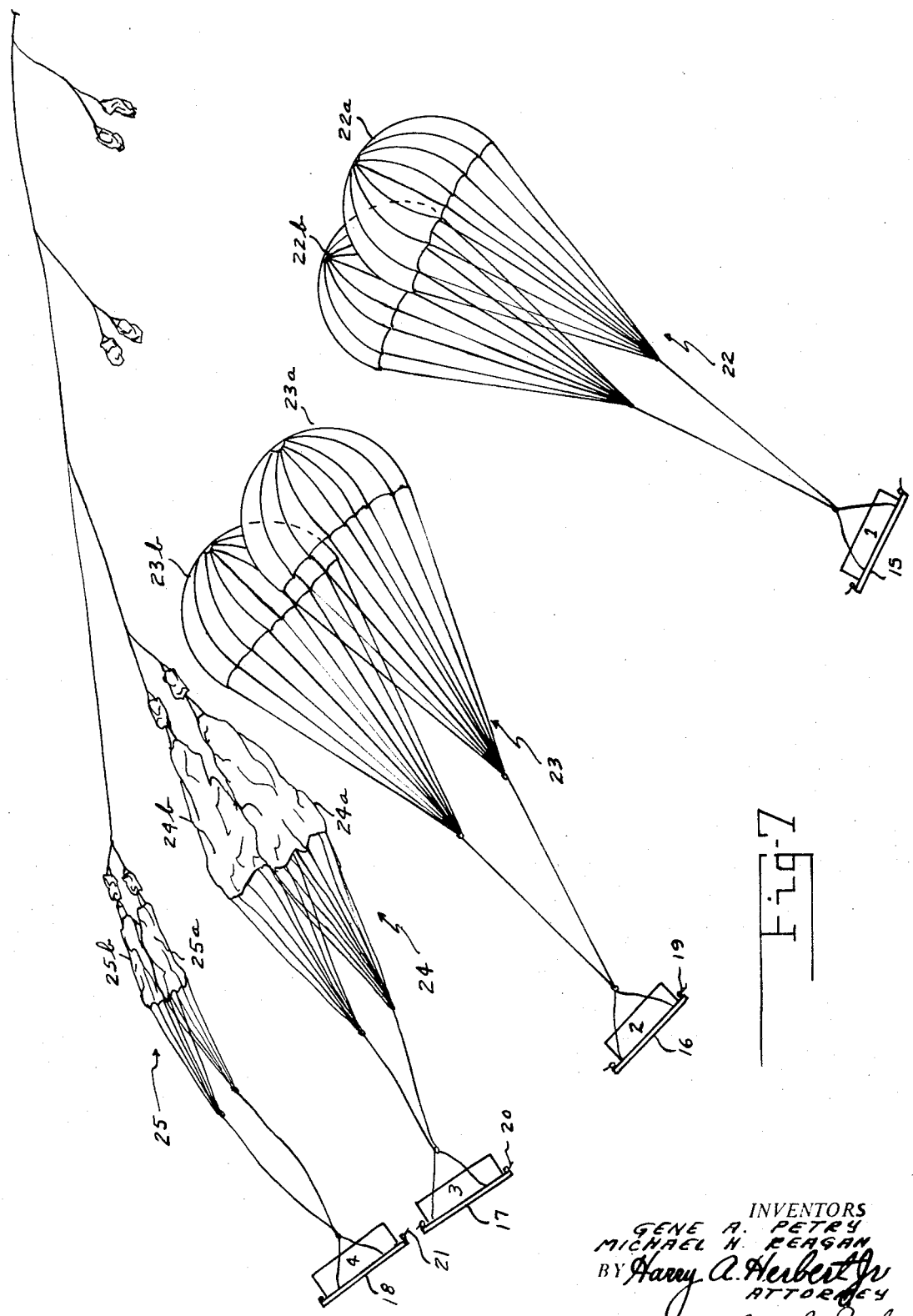

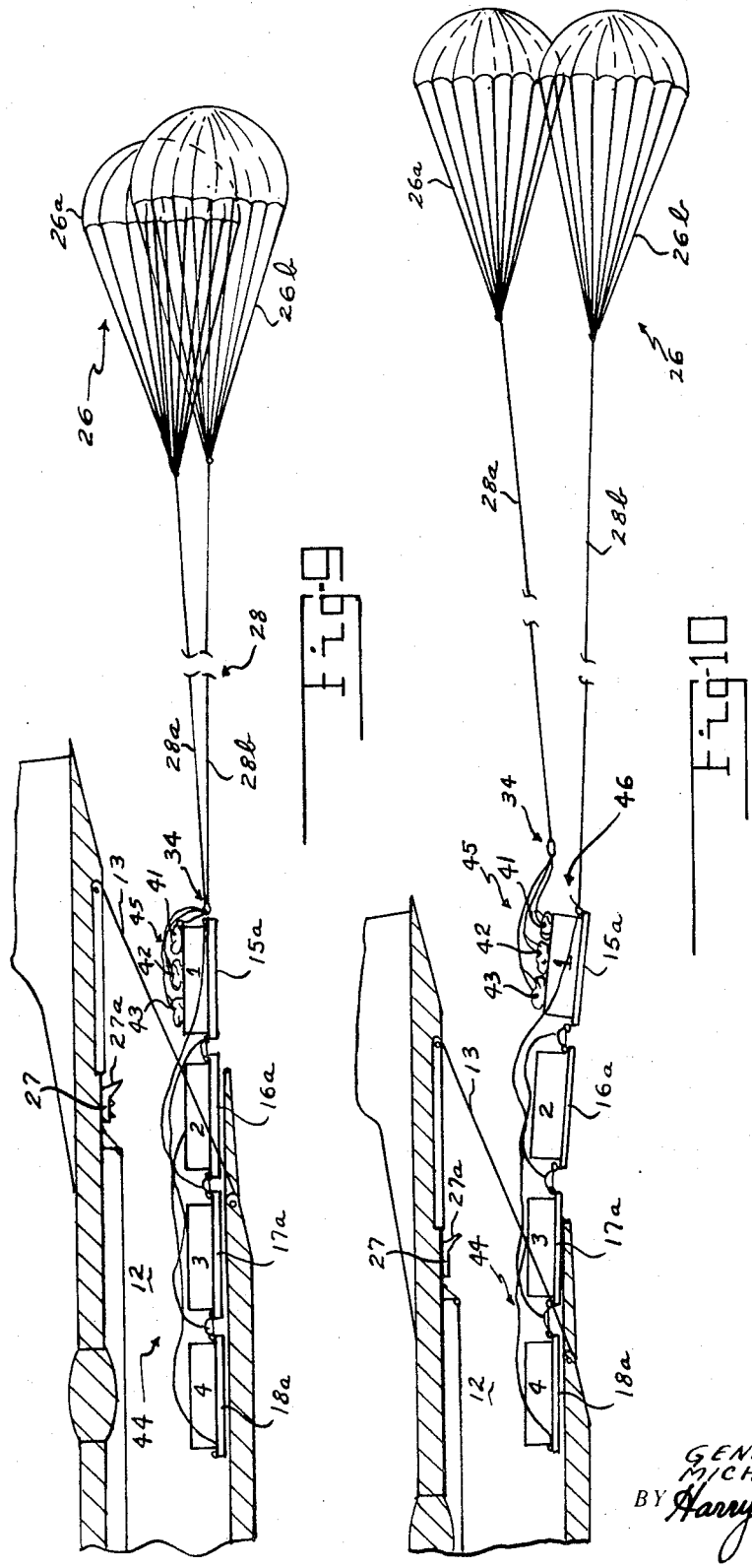

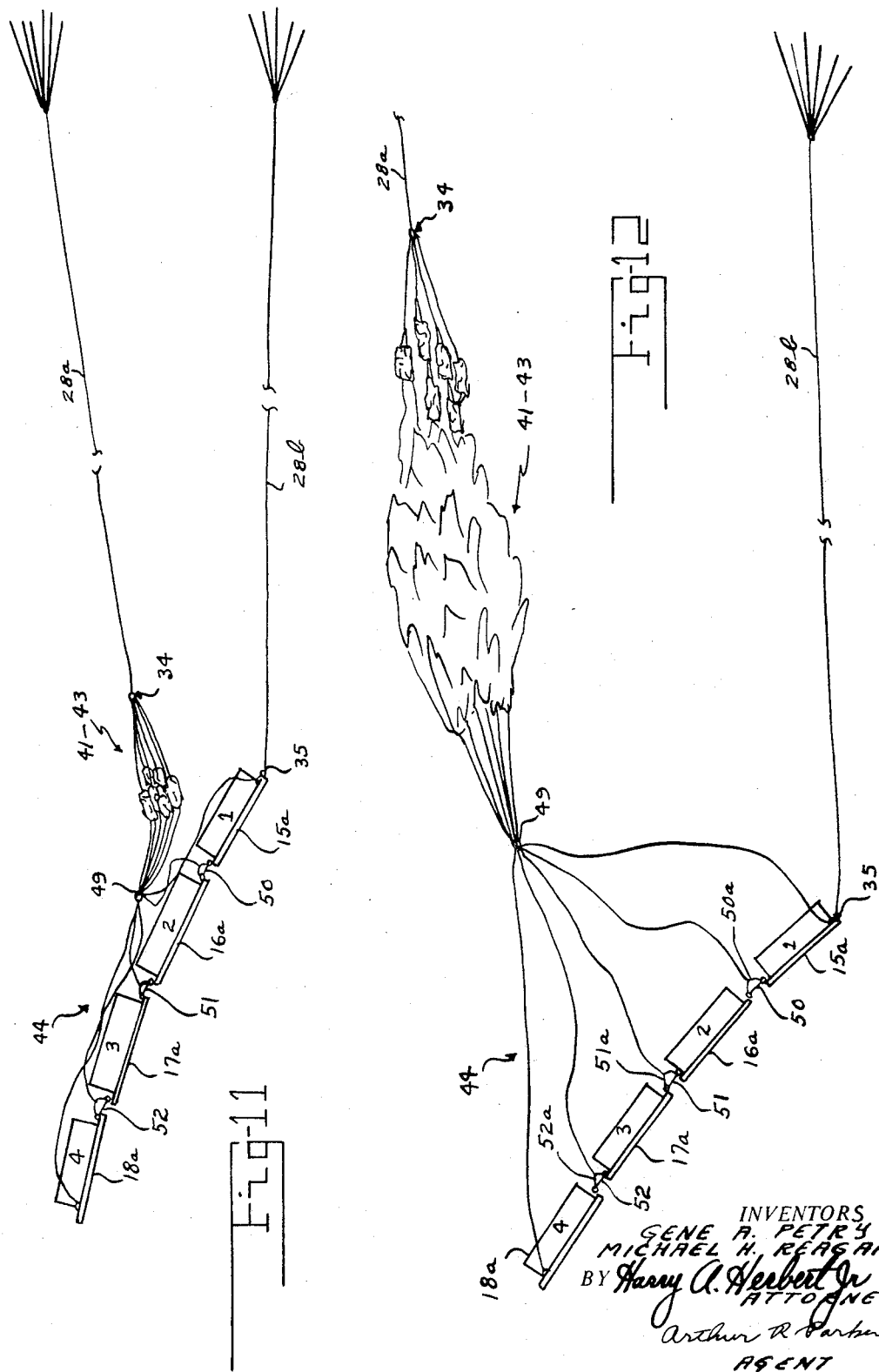

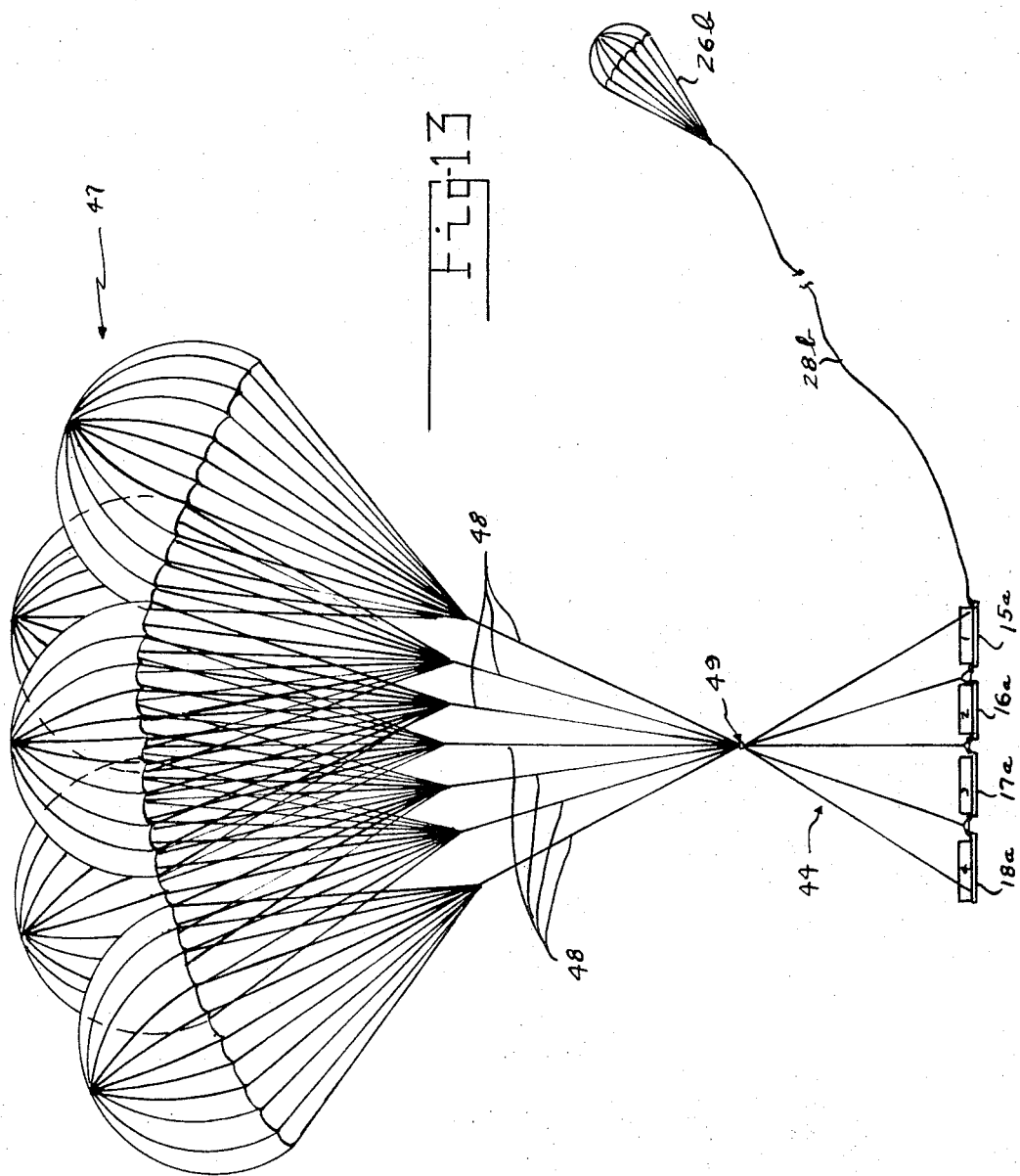

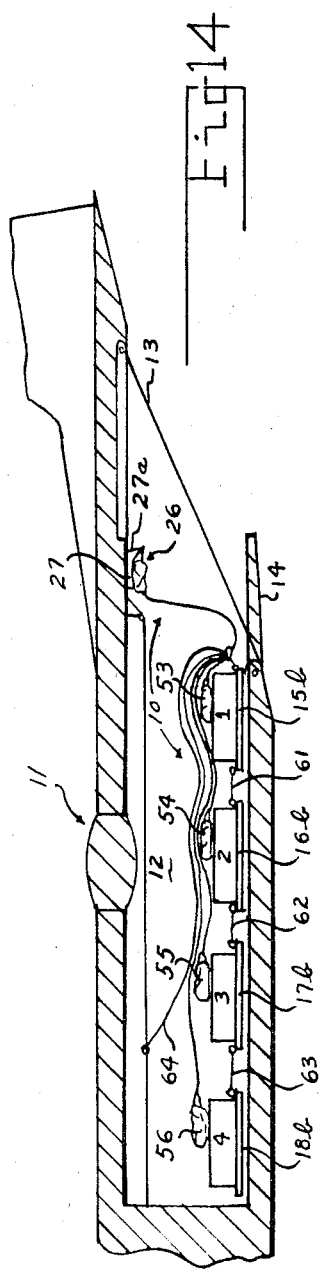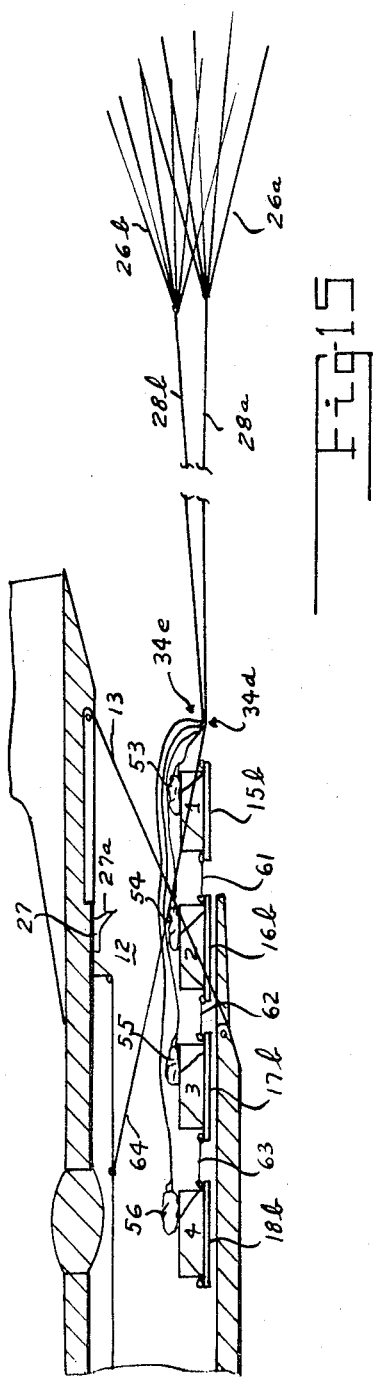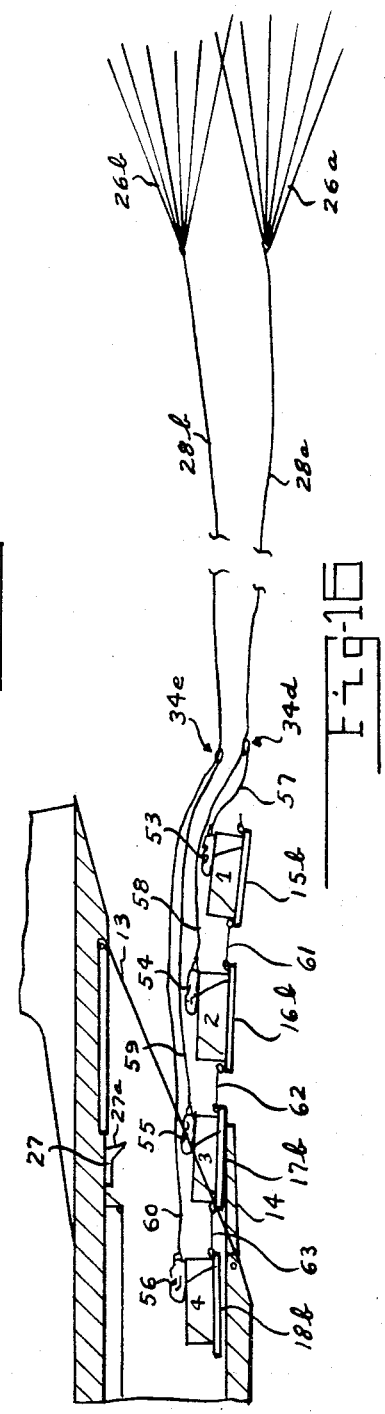

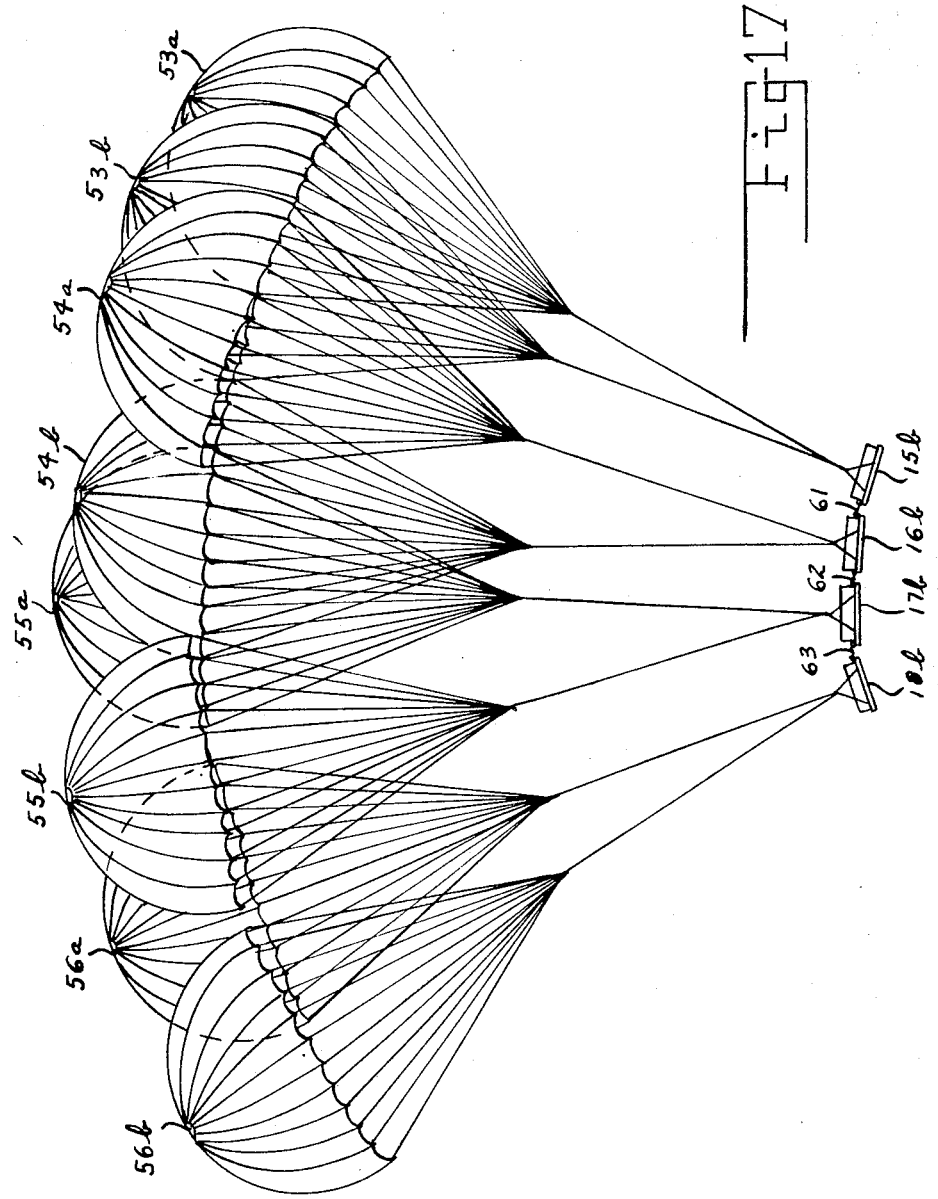

RAPID EXTRACTION SYSTEM

BACKGROUND OF THE INVENTION

This invention relates generally to the aerial delivery of palleted supplies by parachute drop and, in particular, to the improved and more rapid extraction of a series of interconnected cargo loads from within the cargo space of a delivery aircraft, and the automatic deployment of the recovery parachutes assembled to the cargo loads.

In the development of various methods for extracting and parachuting multiple loads from a cargo-type aircraft, one method has involved mounting these loads on a series of platforms or pallets that are separately extracted from the aircraft and individually parachuted to the drop zone. This technique naturally requires a considerable time to extract a plurality of individual loads particularly when the larger-types of present-day cargo aircraft are involved. In a combat situation, many passes of the aircraft over the drop zone would be needed and, of course, both aircraft and aircrew, as well as the ground recovery personnel involved, would be exposed to a much greater amount of hostile fire.

In one effort to increase the speed of extraction of a multiplicity of cargo loads, it has been proposed to incorporate the cargo loads in a series of vertically-stacked containers each mounted on a carrier that may be individually extracted from the aircraft-cargo compartment. Of course, in this arrangement, each cargo container is equipped with its own recovery parachute that is interconnected with the preceding container in the vertical stack. Thus, each recovery parachute must await its deployment until it has fallen a sufficient distance equal to the length of the interconnecting line to the next higher cargo container. With a number of such containers in a vertical stack, it is obvious that an excessive amount of both time and the altitude of their release from the delivery aircraft would be necessary. Also, many such vertical stacks would be required to fill the cargo space of modern-day cargo aircraft. Again, the foregoing technique would involve a considerable time to manually initiate the extraction of these plurality of vertical stacks. Not only does such an arrangement involve considerable risk in a combat zone. but, in addition, the accuracy of the air drop is made more difficult.

The rapid extraction system of the present invention constitutes a significant improvement over the above-described techniques in that it concerns the extraction of multiple cargo loads from the delivery aircraft in substantially one automatic operation that is both greatly simplified, thoroughly reliable and much less time-consuming. Its inherent advantages over other extraction systems will become readily apparent from the following summary and detailed description thereof.

BRIEF SUMMARY OF THE INVENTION

The present rapid extraction system consists basically of a main, extraction parachute pack that is releasably mounted within the cargo compartment of a delivery aircraft, a recovery parachute pack assembled to each of a series of interconnected and palletized cargo-loads positioned in direct alignment with each other within the cargo compartment, an extraction line or lines extending from the extraction parachute pack, and a unique force-transfer mechanism for initially and releasably interconnecting the end of the extraction line or lines directly, and thereby applying the extraction force created by the release of the extraction parachute pack to, the leading cargo load and the remaining cargo loads interconnected therewith. Thereafter, the force-transfer mechanism becomes operative in a novel manner by means of a main, static line to automatically transfer the continuing drag force being exerted by the inflated extraction parachute(s) to a plurality of static-deployment lines each respectively interconnected between the extraction line(s) and the recovery parachute of each cargo load.

The advantages, as well as certain objects, of the invention will become self-evident from the following disclosure thereof, taken in connection with the accompanying drawings, in which;

BRIEF DESCRIPTION OF THE DRAWINGS

FIG. 1 is a side-elevational view, partly schematic and broken-away, of the rear-end portion of one type of cargo aircraft to which the present invention may be applied, and illustrating the stowed condition of the inventive rapid extraction system;

FIG. 1a is a relatively enlarged schematic view, illustrating details of the releasable pivotal connection between one end of the extraction parachute pack-pendulum line and the pivot arm provided on the supporting bracket for the extraction parachute pack;

FIG. 2 is a second side-elevational view, illustrating the condition of the rapid extraction system of FIG. 1 after the extraction parachute pack has been released and the first, extraction step has commenced;

FIG. 3 is a third side-elevational view, showing the beginning of the second, force-transfer step involved in the operation of the present extraction system;

FIGS. 4 and 5, respectively, represent additional side-elevational views, illustrating the third, deployment, and the fourth, parachute inflation steps involved in the operation of one form of the invention, in which the cargo platforms or pallets may be disconnected from each other and then individually parachuted to the recovery site;

FIGS. 6 and 7 represent further side-elevational views of the rapid extraction system of FIGS. 1–5, respectively, depicting the fifth, load separation, and, the sixth, load separation-and-recovery steps thereof; and FIGS. 8–13, and 14–17, inclusive, are still further side-elevational views, somewhat similar to FIGS. 1–7, illustrating respectively the various pertinent steps involved in the operation of a second and third form of the inventive rapid extraction system.

DESCRIPTION OF THE PREFERRED EMBODIMENT

Figure 1B:
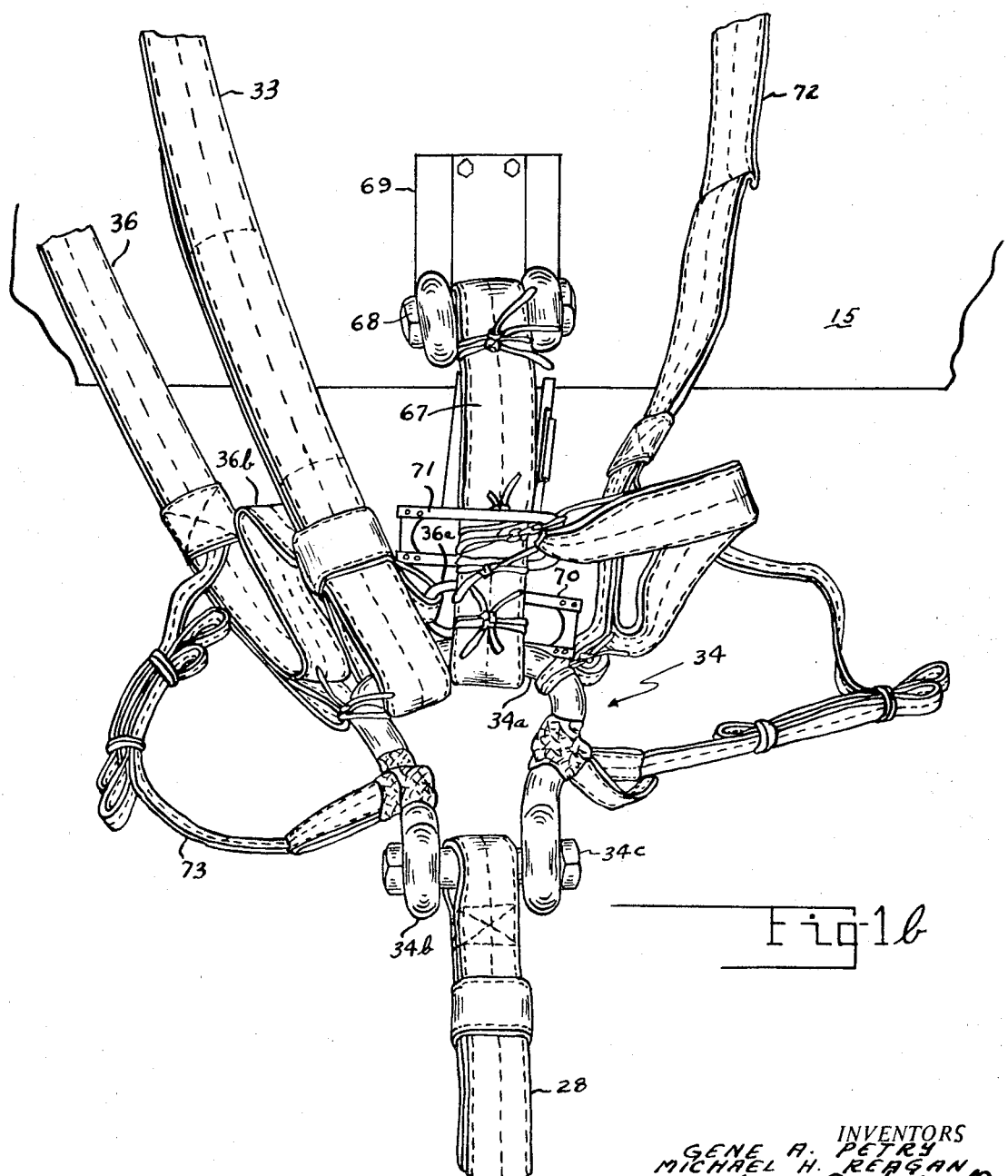
FIG. 1b is a second relatively enlarged and schematic view, partly broken-away, illustrating details of the unique force-transfer mechanism of the present invention.

Referring generally to the drawings and, in particular, to FIG. 1 thereof, one form of the rapid extraction system of the present invention is indicated generally at 10 as being stowed within the cargo compartment 12 of a rear-end loading cargo aircraft 11. The latter is depicted as having a rear-end doorway 13 that includes a lower door element 14, which when lowered to its open position as shown, acts as an extended platform over which the cargo being extracted may be slidably guided and directed during its ejection from the cargo compartment 12 into the open space behind the doorway 13.

A plurality of cargo loads 1, 2, 3, and 4 may be suitably and respectively mounted on the flooring of the cargo compartment 12 by means of the supporting platforms or pallets indicated at 15, 16, parachute and 18. Said platforms or pallets may be preferably interconnected with each other by the connecting links respectively shown at 19, 20 and 21, which links, in the embodiment of the invention depicted in FIGS. 1–7, inclusive, may be designed to separate and thus disconnect the corresponding cargo-supporting platform or pallet 15, 16, 17, 18 associated therewith, by novel severing means to be hereinafter described in detail, in the proper, timed sequence, immediately after the successive extraction of each of the cargo loads 1, 2, 3 and 4 from the aircraft-cargo compartment 12. To provide for the recovery of the extracted cargo loads 1, 2, 3 and 4, each of the latter incorporates its own recovery parachute pack, indicated respectively at 22, 23, 24 and 25, which may consist of one or more parachutes, as required for the particular cargo load.

The necessary extraction force required to extract the aforementioned cargo loads 1, 2, 3 and 4 may be supplied by the deployment and subsequent inflation of one or more extraction parachutes incorporated or folded into the parachute pack, indicated generally at 26 in FIG. 1, for example. Extraction parachute pack 26 may be releasably suspended, as shown, from a bracket member, shown at 27 mounted to the top wall surface of the aircraft cargo compartment 12 by the means, indicated schematically at 27b. The means 27b may comprise part of any standard-type quick-release means, as for example that used in bomb-release mechanisms. Thus, when it is desired to initiate actuation of the present rapid extraction system, the fast release of the extraction parachute pack 26 may be facilitated. The extraction parachute pack 26 may be preferably attached or interconnected to the cargo loads 1, 2, 3 and 4 by means of what constitutes a combined, extraction parachute-extraction and deployment line or lines, indicated generally at 28 in FIG. 1, for example. Said combined extraction and deployment line or lines 28, which naturally may be attached at one end thereof to the forward end of the extraction parachute pack, is shown attached at the other end thereof to one end of a series of recovery parachute-deployment lines of varying lengths, as is depicted respectively at 29, 30, 31 and 32, which deployment lines are, in turn, respectively connected at the other ends thereof to the previously-noted cargo-recovery parachute packs 22, 23, 24 and 25. Actually, the said recovery parachute-deployment lines 29, 30, 31 and 32 may be preferably attached to the end of the combined extraction and deployment line or lines 28 through means of a relatively short, common, connecting line, indicated at 33 in FIG. 4, which is, in turn, attached to the unique force transfer mechanism of the present invention, which mechanism is indicated generally at 34 in FIG. 1, for example, in schematic form and in more detail in FIG. 1b.

The aforementioned force-transfer mechanism 34, which constitutes an important feature of the present invention, is seen particularly in FIG. 1b as comprising, in one configuration thereof, a horse-shoe-shaped clevis having a first, main, closed-end portion at 34a and a second, open-ended portion at 34b that incorporates a pair of aligned holes in which a pin element at 34c is engaged to thereby attach thereto one end of the extraction line(s) 28. Initially, force-transfer clevis 34 is uniquely operative to apply the extraction force being exerted by the inflated extraction parachute 26 directly and solely to the leading cargo load 1 and thus the cargo loads 2, 3 and 4 interconnected therewith. Thereafter, once the extraction operation has been completed, force-transfer clevis 34 automatically acts, in a simplified and novel manner to be hereinafter further described, to transfer the continued drag force being exerted by the extraction parachute 26 to the previously-described deployment lines 29, 30, 31 and 32.

To effect its initial, load-extraction function, the above-referred to force-transfer clevis 34 is further illustrated in the detailed view of the aforementioned FIG. 1b as having a relatively short, endless-type of interconnecting line of webbing material, as indicated at 67, one end of which line 67 is wrapped around the closed-end portion 34a of the clevis 34. The other end of the line 67 is shown wrapped around a second pin element at 68 that is assembled to one end of a load-extraction member, shown in substantially schematic form at 69. The latter element may be mounted in affixed relation, either directly on top of the leading cargo platform 15, or, alternatively it may be mounted on the load 1, as desired. Thus, with the above-described arrangement, any extraction force initially developed by the release and subsequent deployment and inflation of the extraction parachute 26 is applied solely and directly to the leading cargo-pallet 15, through the previously-noted, interconnecting line 67 and load-extraction member 69, for thereby extracting interconnected cargo loads 1, 2, 3 and 4. This sole extraction operation, or first step of FIG. 2, continues until the upper end of the main, static line 36 that is slidably positioned, as noted hereinbefore, on the guide wire or cable 37 has arrived at the cablemounting fixture element 38 (Note FIG. 3), at which time, the further extraction force being applied by the extraction parachute(s) 26, through the line(s) 28, will initially effect actuation or movement of a first cutting knife, indicated at 70 in FIG. 1b, which knife movement results from the lower end of the static line 36 being attached thereto at 36a to thereby sever the previously-described load-extraction line 67 that is interconnected directly to the leading cargo pallet 15 through the load-extraction member 69, as previously explained. A second cutting knife at 71 and an additional static line at 72 appropriately attached to the aircraft may be utilized as a back-up means and simultaneously operated with the first cutting knife 70 to thereby ensure severance of the interconnecting line 67 in the event of a malfunction occurring.

The static line 36 is designed to remain indirectly attached to the extraction line(s) 28, and be ejected from the aircraft-cargo compartment 12 along therewith by virtue of the fact that the upper end thereof in slidable contact with the cable 37 will break away therefrom after reaching the fixture element 38. However, initially the force applied thereto by the previously-noted extraction operation will be effective to provide for the foregoing actuation of the cutting knives 70 and 71. This relatively reduced force is not sufficient to break away the static line 36. In this connection, the lower end of the static line 36 is designed to incorporate both an integral loop portion at 36b, and an additional bypass-type line at 73 that is shown interconnected (Note FIG. 1b) between the static line 36 above the loop portion 36b thereof and the force-transfer clevis 34 adjacent the open-ended portions 34b thereof. The loop portion 36b is made deliberately shorter in length than the line 73 so that the integral loop portion 36b will be taken up and the aforementioned cutting operation of the knives 70, 71 will occur initially. Thereafter, the further rearward movement of the extraction line(s) 28 will take up the slack in the bypass line 73 attached thereto to thereby break-away the upper end of the static line 36 from its attachment with the cable 37.

After the above-noted severing operation of the interconnecting load-extraction line 67 has been completed, the unique force-transfer operation, or second step of FIG. 3, begins, since the force-transfer clevis 34 is now disconnected from the leading load-supporting platform 15 in the novel manner hereinbefore described. Further drag force being exerted by the extraction parachute(s) 26 through the extraction line(s) 28 will then be shifted and transferred, and thereby be applied directly to, and thus deploy, the recovery parachutes 22, 23, 24 and 25, through the common deployment line 33 (Note FIG. 1b and 4, for example) in an improved manner to be hereinafter further described.

The extraction step involved in the initial stage of operation of the present invention may also include additional means for further ensuring that a sufficient extraction force is applied to the leading cargo load-supporting platform 15 during the transition between the extraction and recovery parachute-deployment steps. For this purpose, a short, flexible connecting link, as at 39 in FIG. 3, may be attached between the force-transfer clevis 34 and the platform 15. Link 39, which was not disclosed in FIGS. 1 and 2 for the sake of clarity, may be utilized where needed for a particular application and cargo load. With its use, the extraction force being exerted by the extraction parachute(s) 26 continues to be applied, through the said link 39, to the platform 15 for a short period during the completion of the previously-described, force-transfer step, wherein the clevis 34 becomes operative to transfer the extraction force from its application at the cargo pallet 15 to the common deployment line 39 and from there to the lines 29, 30, 31 and 32 of the cargo-recovery parachutes 22, 23, 24 and 25, as has been noted hereinbefore. Of course, the link 39 is designed to thereafter break-away and thus become inoperative. Initially, the subsequent extraction force will be applied to take-up the built-in slack in the aforesaid recovery parachute-deployment lines 29, 30, 31 and 32, during the transition phase of the force-transfer step, in successive order since the latter have been designed with successively-increasing lengths so that the recovery parachutes 22, 23, 24 and 25 are deployed and thereby inflated in that order, as they are extracted from the cargo compartment 12.

In addition to its releasable suspension to the top wall surface of the cargo compartment 12, the extraction parachute pack 26 may preferably be interconnected to a downwardly and rearwardly-projecting bracket portion 27a formed on the previously-mentioned supporting bracket 27 and known as the "pendulum arm". Pendulum arm 27a is interconnected with the aft end of the extraction parachute pack 26 by means of a pendulum line, indicated at 40. With this system, on release of the parachute pack 26, the latter will swing downwardly and rearwardly in a pendulum arc for ejection out of the rear doorway 13. In this connection, the pivot end of the pendulum 40 may be releasably attached to the pendulum arm 27a, as is depicted in further detail in FIG. 1a. As clearly seen in the latter figure, the aft end of the pendulum line 40 is wrapped around and releasably engaged in a slot provided therefor in the end portion of the pendulum arm 27a, as is indicated at 27c. During its stowed and non-operative position, illustrated in the aforementioned FIG. 1a, the aforesaid end portion of the pendulum line 40 is resiliently retained within the slot 27c by means of a simple spring-type clip element 27d that may be integrally formed or attached to the top surface portion of the pendulum arm 27b and so positioned to extend in resilient, closing relation over the slot 27c. Thus, during the aforementioned swing of the released extraction parachute pack 26 in its pendulum arc, the end portion of the pendulum line 40 will be automatically released from the slot 27c and thereafter eject from the aircraft-cargo compartment 12, along with the parachute pack 26 interconnected therewith. At this point, the combined extraction and deployment line 28, which remains attached to the pack 26, becomes operative to effect deployment and inflation of one or more extraction parachutes 26.

On deployment and inflation of the parachute pack 26, as noted hereinbefore, a pair of extraction parachutes, as illustrated at 26a and 26b in FIG. 2, for example, may be utilized to provide the necessary extraction force, if desired. The aforesaid FIG. 2 and FIG. 3 depict the initial steps; namely, the first and second steps involved in the operation of one form of the inventive rapid extraction system wherein the initially-interconnected cargo-pallets 15, 16, 17 and 18 may be subsequently disconnected from each other, and thereafter separately parachuted to the drop zone. The above-noted, ejection of the parachute pack 26 followed by the deployment and inflation of the extraction parachutes 26a and 26b will result in the application of a substantial extraction force directly to the leading cargo load 1, and the cargo loads 2, 3, and 4, through means of the previously-noted, novel force-transfer clevis 34 which is initially directly attached to the pallet 15. The drag force being exerted by the extraction parachutes 26a and 26b will then effect extraction of the cargo loads 1, 2, 3, and 4, the beginning of which is illustrated in the aforesaid FIG. 2. After the foregoing development and application of the necessary extraction force, the previously-described force-transfer step occurs by the automatic action of the force-transfer mechanism or clevis 34 in the manner previously described. Next, the deployment lines 29, 30, 31 and 32 are activated, as noted before, and immediately thereafter, the third step involving the deployment of the cargo-recovery parachutes 22, 23, 24 and 25 begins, which step is shown in FIG. 4. Of course, at this time, the cargo loads 1, 2, 3 and 4 have now been completely extracted from the aircraft-cargo compartment 12, and the drag force of the extraction parachutes 26a and 26b continues to act on the parachute-deployment lines 29, 30, 31 and 32 to thereby complete in successive order the full deployment and the subsequent beginning inflation of the recovery parachutes 22, 23, 24 and 25, the latter operation constituting the fourth step in the operation of the invention and being illustrated in FIG. 5. In this regard, each of the said recovery parachutes may actually consist of a pair of parachutes, if desired, as is indicated, for example, respectively at 22a and 22b, 23a and 23b, 24a and 24b, and at 25a and 25b in the aforesaid FIG. 5. Also, the deployment lines 20, 30, 31 and 32 are made of increasingly-greater lengths, as shown and as noted hereinbefore, corresponding to the desired sequence of deployment and time of inflation, with, of course, the line 29 of the leading recovery parachute 22 being the shortest.

In the aforementioned parachute inflation step of FIG. 5, the leading pair of recovery parachutes 22a and 22b have been fully deployed and substantially inflated, with the recovery parachutes following thereafter clearly shown in various degrees of deployment and inflation. In the inventive form of FIGS. 1-7, inclusive, the connecting links 19, 20 and 21 may be automatically severed with the platforms therebetween disconnected at the proper time by the use of a similarly-designed force-transfer clevis and cutting knife means, such as has been previously described, which may be easily installed in each connecting link. In this regard, the severance of the first connecting link 19 naturally results in the disconnecting of the leading cargo platform or pallet 15 from the next cargo pallet 16, as is depicted in the aforesaid FIG. 5.

The foregoing platform-disconnect operation of the platform or pallet 15, which is schematically illustrated in the above-referred to FIG. 5, is followed immediately thereafter by the complete separation of the platform or pallet 15 and its cargo load 1, and the disconnecting of the second platform or pallet 16 from the third pallet 17 by the severance of connecting link 20, as is illustrated in the fifth, load-separation step of FIG. 6. During this sequence, the recovery parachutes 22a and 22b and their cargo load 1 are now engaged in their separate and independent recovery operation, and parachutes 23a and 23b of cargo load 2 have become fully deployed. Finally, in the sixth, combined, load separation and recovery step of FIG. 7, the connecting link 21 between cargo loads 3 and 4 has been severed, resulting in the disconnecting of the platform or pallet 17 from the pallet 18 to thereby complete the separation of cargo load 3 from cargo load 4 immediately thereafter. At this time, recovery parachutes 24a and 24b, and 25a and 25b, respectively, of cargo loads 3 and 4 have practically fully deployed and, of course, the recovery parachutes 23a and 23b of cargo load 2 has completely inflated, and the latter is in its recovery phase. The recovery parachutes 24a and 24b, and 25a and 25b of loads 3 and 4 will then fully inflate, followed by their successive recovery on the selected drop zone, of course, immediately after the recovery of cargo loads 1 and 2.

Although the form of the invention described hereinbefore in connection with FIGS. 1-7 utilizes connecting links between the various cargo load-supporting platforms or pallets that may be severed, as noted hereinbefore, the present rapid extraction system may be just as easily used with a series of cargo loads that remain interconnected throughout the extraction and recovery phase of operation. In one such arrangement, illustrated in FIGS. 8-13, the cargo loads to be extracted remain interconnected and may thereby be collectively recovered through the attachment of the said loads to the recovery parachutes by means of a common confluence of attachment point. Thus, in FIG. 8, for example, the cargo loads 1, 2, 3 and 4 are shown mounted on the flooring of the cargo compartment 12 of the rear-end loading-type of cargo aircraft 11, as was previously-described. These cargo loads 1, 2, 3 and 4, which may be mounted on supporting platforms or pallets 15a, 16a, 17a and 18a that are similar to that of FIGS. 1-7, may be respectively interconnected by means of the relatively short, permanent connecting links at 50, 51 and 52. The latter, unlike the previously-described severable links 19, 20 and 21 of the inventive form of FIGS. 1-7, are designed to remain intact throughout the extraction and recovery steps and thus retain the cargo loads 1, 2, 3 and 4 interconnected to each other all the way to the drop zone. Again, the same main, extraction parachute or parachutes may be folded into a pack, as indicated at 26 in FIG. 8, for example, and then releasably mounted, as before, to the top wall of the cargo compartment 12 by means of the bracket at 27. Also, a plurality of common, recovery parachutes, indicated respectively at 41, 42 and 43 may be utilized for recovering cargo loads 1, 2, 3 and 4. These recovery parachutes may be interconnected, as a group, to the cargo loads 1, 2, 3 and 4 by means of a series of suspension lines, indicated generally at 44 in FIG. 8, for example, which, as will be hereinafter described in detail, collectively form a suspension sling interconnected between the recovery parachutes 41, 42 and 43 and the cargo loads 1, 2, 3 and 4.

The main extraction parachutes 26a and 26b, again, may be further attached to the bracket member 27 by means of a connecting line at 40 extending between the parachute(s) 26 and the previously-described, downwardly and rearwardly projecting bracket portion, or pendulum arm at 27a. Thus, on release of the parachutes 26a and 26b, the latter will swing in a downward and rearward direction, in a pendulum-like manner, as was previously described in connection with FIGS. 1-7, for ejection rearwardly out of the rear-end doorway 13. Again, at this point, the end of the connecting line 40 pivoted to the projecting pendulum arm 27a is automatically released, as in the case of the inventive form of the aforesaid FIGS. 1-7. Thus, cargo loads 1, 2, 3 and 4 will be extracted and then parachuted together to the drop zone, in the unique and improved manner to be further described hereinafter.

Respectively interconnected between the extraction parachutes 26a and 26b (FIG. 8) may be the extraction line means, indicated generally at 28. The latter may, in one operation, actually consist of a plurality of extraction lines, such as the pair of extraction lines, indicated at 28a and 28b in FIG. 9, for example. On the end of the extraction line 28a may be incorporated the force-transfer clevis 34, previously-described in connection with FIGS. 1-7. The aforesaid recovery parachutes 41, 42 and 43 may be interconnected with the said force-transfer clevis 34 by means of a series of deployment lines, indicated generally at 45 in FIG. 9, for example. On the other hand, the extraction line 28b from the extraction parachute 26b may be permanently attached directly to the leading cargo-pallet 15a, as shown, for the sake of simplicity, since, when it has performed its function, it will not interfere with the remaining phases of operation of the inventive system. With this arrangement, the end of the extraction line 28a may be initially releasably interconnected directly with the leading cargo-platform 15, during the extraction phase of operation, by means of the force-transfer clevis 34, and thereafter automatically disconnected therefrom, as is schematically depicted by the reference numeral 46, to thereby reapply the continued extraction force directly to the previously-noted deployment lines 45, in the novel manner previously-described. Lines 45 are respectively attached to the recovery parachutes 41, 42 and 43, as is indicated in the force transfer step of FIG. 10. Initially, however, the forces being exerted by both extraction parachutes 26a and 26b have been previously utilized to extract the cargo loads 1, 2, 3 and 4, as is depicted in the step of FIG. 9.

After applying the necessary extraction force (FIG. 9) and then completing the aforementioned force transfer step (FIG. 10), deployment of the recovery parachutes 41, 42 and 43 commences, by the continued drag force being exerted by the extraction parachute 26a through its extraction line 28a, as is illustrated in FIG. 11. Immediately thereafter, the successive inflation of the aforesaid recovery parachutes 41, 42 and 43, in that order, begins, as is depicted in FIG. 12. In the latter view, the previously-referred to suspension sling, formed by the suspension lines indicated at 44, is clearly visible.

The complete inflation and load descent phase involved in the operation of the second form of the unique rapid extraction system is clearly seen in FIG. 13. In the latter figure, the previously-referred to recovery parachutes, shown in schematic form at 41, 42, 43 in FIGS. 8-12, have actually been expanded into a cluster of recovery parachutes, one configuration of which may comprise the depiction generally designated by the reference numeral at 47 (FIG. 13). The best configuration is dependent, of course, on the particular loads to be carried and, moreover, is still the subject of investigation. As particularly seen in the aforesaid FIG. 13, the series of connected cargo loads 1, 2, 3 and 4 may actually be suspended from the plurality of recovery parachutes 47 by means of the previously-described suspension sling comprising the suspension lines at 44, which may be interconnected with the parachute risers, indicated at 48, through the use of a cluster clevis device, indicated schematically at 49, which cluster clevis device, in effect, constitutes a common confluence point through which the connected loads 1, 2, 3 and 4 may be recovered. The aforementioned connecting links 50, 51 and 52, which, as previously-noted, remain interconnected throughout the operation of the second form of the invention, have each been slightly modified as is clearly visible in FIG. 12, for example, to thereby provide for a lifting link-portion, indicated at 50a, 51a and 52a, respectively, that may be attached, as shown, to a corresponding suspension line 44.

In still another form of the present rapid extraction system, illustrated in FIGS. 14-17, inclusive, instead of the cargo loads 1, 2, 3 and 4, for example, being suspended from a cluster of recovery parachutes through a common confluence point, as in the inventive form of FIGS. 8-13, each cargo load 1, 2, 3, 4, though remaining interconnected with each other, throughout the recovery operation, is suspended to its own cluster of recovery parachutes. Therefore, in FIG. 14, for example, the cargo, represented by cargo loads 1, 2, 3 and 4, is once again shown positioned in the cargo compartment 12 of a typical rear-end loading type of cargo aircraft 11 having a rear-end doorway at 13, with a lower door element at 14 for the same purpose, as previously described. The unique rapid extraction system of the present invention is indicated generally at 10 as comprising the previously-noted extraction parachute means, indicated generally at 26, which is, once again, releasably suspended from the bracket member 27 fixed to the top wall of the cargo compartment 12. A separate recovery parachute pack is utilized for, and may be interconnected in suspended relation to each of the supporting platforms or pallets, indicated at 15b, 16b, 17b and 18b, respectively, of the cargo loads 1, 2, 3 and 4 being used to describe the third form of the invention. These recovery parachutes are indicated in FIG. 14, for example, at the reference numerals 53, 54, 55 and 56.

In the extraction step of FIG. 15, the main, parachute pack 26 has, again, been shown deployed into two extraction parachutes at 26a and 26b, each incorporating a separate extraction line, indicated at 28a and 28b, respectively. As may be seen more clearly in the force transfer step of FIG. 16, each of the aforesaid extraction lines 28a and 28b may incorporate the same force-transfer clevis 34, as has been previously-described, and as is indicated schematically at 34d and 34e. Again, to one side of each clevis 34d, 34e may be respectively attached the ends of several deployment lines, as at 57, 58, 59 and 60, that are, in turn, interconnected with the cargo-recovery parachutes 53, 54, 55 and 56 corresponding thereto. As is seen, for example in the aforesaid FIG. 16, the force-transfer clevis 34d of the extraction line 28a is shown attached to the pair of deployment lines 57 and 58 corresponding to the recovery parachutes 53 and 54 of the first two cargo loads 1 and 2, whereas, the force-transfer 34e of the extraction line 28b is shown attached to the remaining pair of deployment lines 59 and 60 of the last two cargo loads 3 and 4.

As in the case of the inventive form of FIGS. 8-13, the supporting platforms or pallets 15b, 16b, 17b and 18b may be similarly interconnected by relatively short connecting links, indicated respectively at 61, 62 and 63, which, again unlike the connecting links 19, 29 and 21 of FIGS. 1-7, may be designed to remain interconnected throughout the extraction and recovery stages.

The rapid extraction system form of FIGS. 14-17 may be actuated, or placed into operation, as indicated hereinbefore, by the release of the extraction parachute pack 26 from its attachment to the bracket member 27, which, then, swings downwardly and rearwardly in a pendulum-like arc for quick ejection through the rear-end doorway 13, where, as depicted in FIG. 14, simultaneous inflation of the pair of extraction parachutes, at 26a and 26b, occurs. Initially, of course, the drag being exerted by both extraction parachutes 26a, 26b acts directly on the leading cargo load-supporting pallet 15b to thereby apply the requisite extraction force to the permanently interconnected cargo loads 1, 2, 3 and 4. This initial action, which is depicted in the extraction step of FIG. 15, results from both of the previously-described, force-transfer clevises 34d and 34e, respectively attached to the ends of extraction lines 28a and 28b, being initially interconnected directly to the leading cargo pallet 15b, as indicated before. Thereafter, once again by the operation of a corresponding main static line, such as at 64 (FIG. 16), each of the force-transfer clevises 34d and 34e may become operative, in the same manner described in connection with FIGS. 1-7, to automatically transfer the extraction force, being transmitted respectively through extraction lines 28 a and 28b, to a parachute deployment force acting against, and through the previously-mentioned, deployment lines 57, 58, 59 and 60. This latter action, of course, results in the full deployment and subsequently, complete inflation of the recovery parachutes 53-56 in the corresponding pairs previously indicated for each of the said extraction parachutes 26a and 26b. In this connection, each of the said recovery parachutes may, as seen in the load descent step of FIG. 17, preferably consist of a pair of parachutes, as is depicted respectively at 53a and 53b, 54a and and 54b, 55a and 55b, and 56a and 56b. Thus, as is illustrated in the fully inflated and load descent step of the aforesaid FIG. 17, one overall configuration may consist of a total of eight recovery parachutes being utilized to recover the series of permanently interconnected cargo loads 1, 2, 3 and 4 at the selected drop zone.

We claim:

1. In a rapid extraction system for extracting and parachuting airborne cargo from within the cargo compartment of a cargo-type delivery aircraft to a selected drop zone; a main parachute pack containing at least one, combined extraction and deployment parachute incorporating a relatively elongated, combined extraction and deployment line and releasably suspended in independent relation from the top wall of the aircraft-cargo compartment; cargo-load-carrying means having at least one cargo load and being positioned on the flooring of the aircraft-cargo compartment, and being further equipped with recovery parachute means incorporating static line-deployment means indirectly interconnected, with a built-in slack configuration, with the end of said combined extraction and deployment line; and force transfer means including a first, open-end portion directly affixed to the end of said combined extraction and deployment line and further incorporating a second, integral, closed-end portion; a first, relatively short, flexible link attached between said closed-end portion and said cargo-load-carrying means to thereby ensure the initial application of the entire drag force resulting from the release and inflation of the combined extraction and deployment parachute to extract said cargo-load-carrying means rearwardly from the aircraft-cargo compartment; built-in severing means incorporated with said first, relatively short, flexible link and having a main, elongated static line slidably attached at one end to the aircraft and at its other end in operating relation with the severing means, and further dimensioned to automatically actuate the severing means to thereby separate said first, relatively short link and its connection to the cargo-load-carrying means after the latter has been extracted from the aircraft-cargo compartment by said extraction and deployment parachute; a second, relatively elongated, flexible link interconnected between said closed-end portion and the end of said static line-deployment means for thereby receiving, directing and thus effecting the automatic transfer of the continued drag force being exerted by the inflated extraction and deployment parachute initially to take up the inherently formed, built-in slack in the end of said static line-deployment means and subsequently to cause the latter to deploy the recovery-parachute means for parachuting the cargo-load-carrying means to the selected drop zone; and automatically separable means interconnected between said closed-end portion and said cargo-load-carrying means for temporarily applying a supplemental extraction force to, and thereby ensuring the complete extraction of said cargo-load-carrying means from the aircraft-cargo compartment during the initial transfer of the extraction force from the cargo-load-carrying means to take up the built-in slack formed in the end of the static line-deployment means immediately after the first, relatively short flexible link has been served.

2. In a rapid extraction system as in claim 1, wherein said cargo-load-carrying means comprises a plurality of cargo-load-supporting platforms each carrying its own separate load and being further interconnected with each other by a series of flexible connecting links, each of said connecting links incorporating a built-in severing means including a knife-like cutting device and a separate, relatively elongated, static-type line attached within the aircraft-cargo compartment and to the knife-like cutting device; said static-type lines being of progressively longer lengths and thus automatically operative in successive order to actuate said cutting device and thereby separate each cargo-load-supporting platform immediately after the complete extraction thereof from the cargo compartment.

3. In a rapid extraction system as in claim 1, wherein said main parachute pack comprises a matching pair of combined extraction and deployment parachutes, each having a combined, extraction and deployment line; and said cargo-load-supporting means comprises a plurality of separate cargo loads interconnected with each other by a series of flexible connecting links, each having separate, built-in and automatically operating severing means each controlled in its operation by a separate static line dimensioned in progressively-increasing lengths to thereby separate the respective link in timed sequence with the successive extraction of the cargo loads; each of said cargo loads further incorporating recovery-parachute means having static-deployment lines interconnected in adjacently-oriented pairs with the separate recovery-parachute means corresponding thereto; said force transfer means-open and closed-end portions being configured into a clevis element attached between each of said combined extraction and deployment lines and the said static-deployment lines of a corresponding pair of recovery parachutes; the closed-end portion of said force transfer-clevis incorporating one end of the said first, relatively short, flexible link interconnected with the leading cargo load of said plurality of cargo loads, and further having knife-cutting means integrated with said first, relatively short, flexible link and actuated by the said main, elongated static line having one end portion thereof slidably positioned on a cable mounted to the top wall of the aircraft-cargo compartment to thereby sever said connecting link and thus disconnect the initial attachment of said combined extraction and deployment line to the leading cargo load.

4. In a rapid extraction system as in claim 1, wherein said automatically separable means interconnected with said closed-end portion and said cargo-load-carrying means comprises a third, relatively short, breakaway flexible link initially resistant to a tendency to separate under the drag being exerted thereon by said deployment and extraction parachute until a significant supplemental extraction force has been applied to assure the full extraction of the said cargo-load-carrying means.

* * * * *